United States Patent [19]

Dearman

[11] 4,338,712
[45] Jul. 13, 1982

[54] WELDING FIXTURE FOR USE IN JOINING TWO TUBULAR MEMBERS

[76] Inventor: Timothy C. Dearman, P.O. Box 937, Pearland, Tex. 77581

[21] Appl. No.: 183,313

[22] Filed: Sep. 2, 1980

[51] Int. Cl.³ .............................................. B23K 37/04
[52] U.S. Cl. ................................. 29/281.6; 29/281.5; 228/49 R; 269/41
[58] Field of Search ............ 228/49 R, 49 B; 269/41, 269/42, 49; 29/281.1, 281.5, , 281.6; 254/131; 219/161

[56] References Cited

U.S. PATENT DOCUMENTS

| | | | |
|---|---|---|---|
| 1,524,907 | 2/1925 | Borard | 219/161 |
| 2,387,154 | 10/1945 | Kalwitz | 269/41 X |
| 3,030,903 | 4/1962 | Morris | 29/281.6 X |
| 3,901,497 | 8/1975 | Dearman | 228/49 B X |
| 4,195,828 | 4/1980 | Peterson | 228/49 B X |

Primary Examiner—Howard N. Goldberg
Assistant Examiner—Fred A. Silverberg
Attorney, Agent, or Firm—Learman & McCulloch

[57] ABSTRACT

A fixture for locating and holding a fitting in position to be welded to a base member comprises a body for clamping the fixture, adjustable supporting legs for securing the body in a selected position at one side of the base member, and an anchor device carried by said body and having retainer fingers movable through the fitting and an opening in the base member for engagement with the opposite side of the latter. The retainer fingers are movable between retracted and projected positions.

14 Claims, 6 Drawing Figures

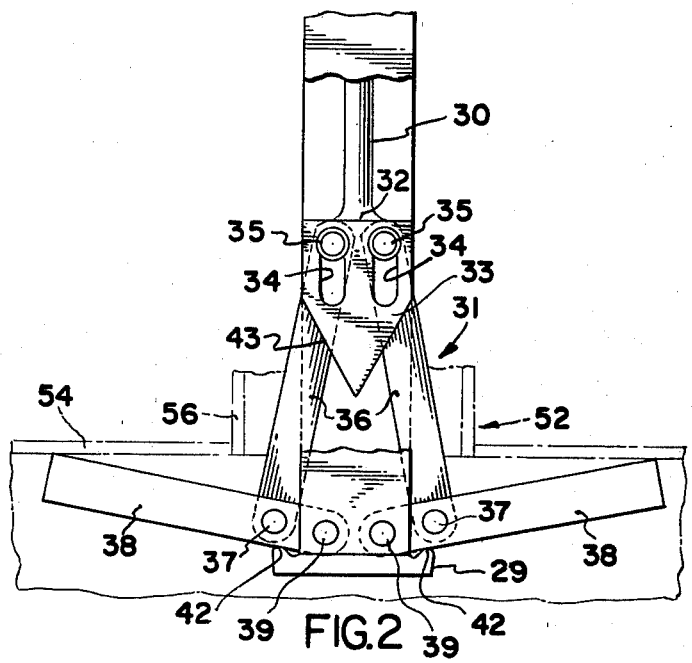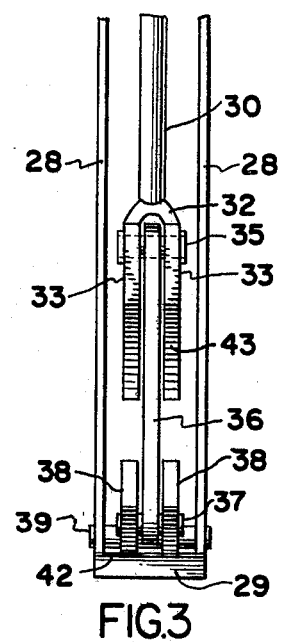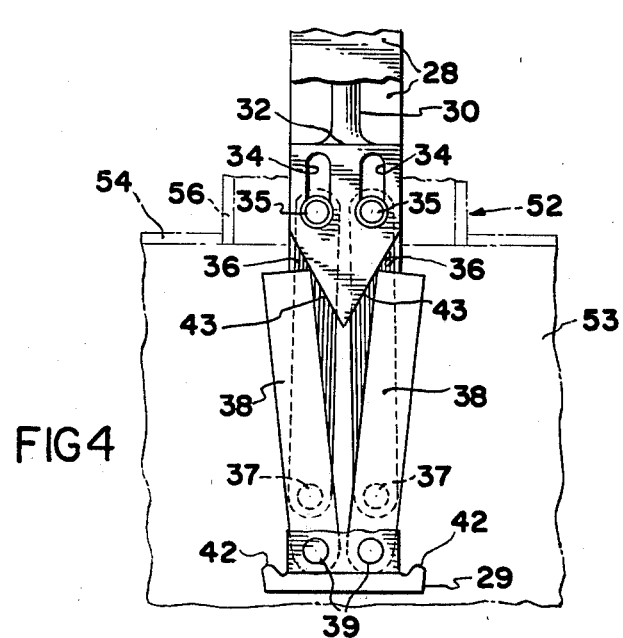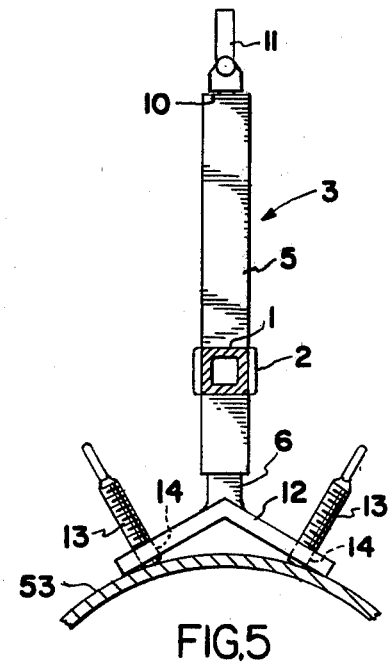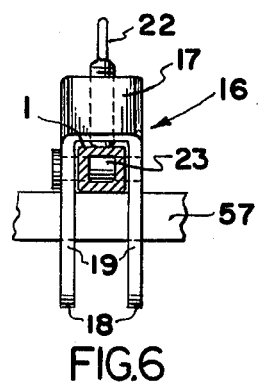

WELDING FIXTURE FOR USE IN JOINING TWO TUBULAR MEMBERS

BACKGROUND OF THE INVENTION

It is commonplace to weld a branch pipe, a nozzle, a coupling, or other fitting to a base member such as a pipe, tank, or other vessel. The base member conventionally is provided with an opening to accommodate one end of the fitting so as to enable the fitting to be welded to the base member. In some instances the axis of the fitting is normal to the axis of the base member, but in other instances the axes are at an angle other than 90°. In either case it is the practice to locate the base member and fitting in the position they are to occupy upon completion of the welding operation and tack-weld the members to one another. Accurate positioning of the members relative to one another heretofore has been an extremely difficult and time consuming task requiring considerable skill on the part of the welder and the use of elaborate and cumbersome fixtures, most of which have been devised by individual welders for specific types of fittings.

Apparatus constructed in accordance with the invention is adapted for use in locating and holding any one of a large number of different fittings relative to a base member and maintaining the relative positions of the fitting and base member until they have been welded to one another. A fixture according to the invention is substantially universally adjustable, thereby enabling the fitting and base member to be joined in a selected one of a number of relative positions. The substantial universality of adjustment of the fixture enables relatively rapid positioning of the fitting relative to the base member, thereby substantially minimizing the time and complexity in joining the fitting to the base member.

SUMMARY OF THE INVENTION

Apparatus constructed according to the invention comprises a fixture for use in positioning and holding a fitting relative to a base member to enable the fitting and base member to be welded to one another. The fixture comprises a body member provided with supporting legs at its opposite ends that are adapted to bear on the base member and straddle an opening provided in the base member. The body is provided with clamps for supporting a fitting in a position to encircle or be accommodated in the opening in the base member.

The body carries an adjustable anchor member one end of which is movable into and out of the opening in the base member. The one end of the anchor member has retaining means movable from a retracted position, enabling passage of the anchor member through the opening in the base member, to a projected position engageable with the base member on the inside of the latter. The supporting legs and retaining members thus cooperate with one another to hold the fitting in a fixed position relative to the base member.

Each of the supporting legs and each of the fitting clamps is provided with means for effecting adjustment of the body in multiple planes, thereby enabling substantially universal adjustment of the fitting relative to the base member.

The anchor member and the body preferably are spring biased relative to one another to ensure retention of the fitting and facilitate fine adjustment of the fitting relatively to the body.

DESCRIPTION OF THE DRAWINGS

Apparatus constructed in accordance with the invention is disclosed in the following description and in the accompanying drawings, wherein:

FIG. 2 is a fragmentary, enlarged elevational view of a portion of the apparatus shown in FIG. 1;

FIG. 3 is a side elevational view of the apparatus shown in FIG. 2;

FIG. 4 is a view similar to FIG. 2, but illustrating the apparatus in an adjusted position;

FIG. 5 is a sectional view taken on the line 5—5 of FIG. 1; and

FIG. 6 is a sectional view taken on the line 6—6 of FIG. 1.

DETAILED DESCRIPTION

Figure 1:
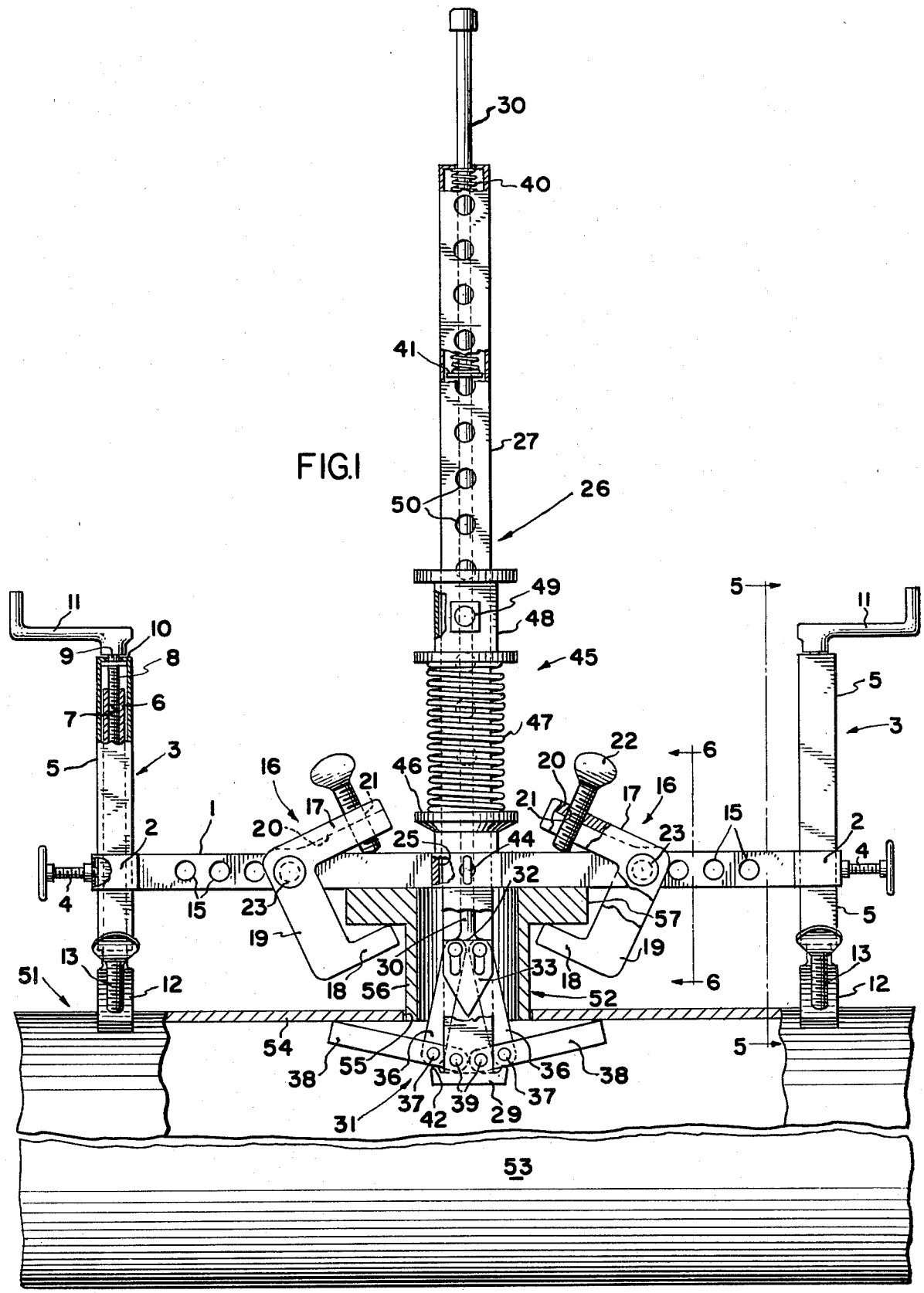
FIG. 1 is a fragmentary, side elevational view with parts broken away and illustrating a fixture holding a fitting in position to be welded to a base member.

A fixture according to a preferred embodiment of the invention comprises an elongate support body 1 having sockets 2 at its opposite ends through each of which slideably extends a supporting leg 3. Each socket 2 is provided with an adjustable clamp screw 4 by means of which the associated support leg 3 may be secured in any selected position of longitudinal adjustment.

Each support leg 3 comprises a preferably square, hollow tube 5 within which is a slide 6 having an internally threaded bore 7 in which a correspondingly threaded screw 8 is accommodated. An unthreaded portion 9 of each screw 8 is journaled in a cap 10 forming a closure for the upper end of tube 5. The lower end of the tube 5 is open. An adjusting crank 11 is fixed to each screw 8 to enable longitudinal adjustment of the slide 6 relative to the tube 5.

Each slide 6 projects beyond the lower end of associated tube 5 and is fixed to a two limbed, V-shaped foot 12. Each limb of the foot carries an adjustable screw 13 which passes through a correspondingly threaded opening 14 in the foot.

The body member 1 is provided with a plurality of spaced openings 15 and a pair of generally C-shaped clamps 16 having parallel arms 17 and 18 joined by a bight 19. The arm 17 of each clamp 16 is channel-shape in cross section and has a web 20 provided with an opening 21 through which a threaded adjusting screw 22 extends. The web 20 terminates adjacent the bight 19, whereby the arms 18 and the bight 19 are composed of two parallel parts which straddle the body 1. At the juncture of the arm 17 and the bight 19 of each clamp is an opening through which extends a removable pin 23 by means of which each clamp is rockably mounted on the body 1 at a selected one of the openings 15.

The construction of each clamp 16 is such that the web 20 may bear against the upper surface of the body 1 and position the arm 18 parallel to, but spaced from, the lower surface of the body 1. However, the adjusting screws 22 may be manipulated so as to rock the clamps 16 about the axes of the respective pins 23 and vary the spacing between the arms 18 and the body 1.

At the center of the body 1 is an opening 25 through which slideably extends an anchor member 26. The anchor member comprises a hollow, preferably square tube 27 terminating at its lower end in a pair of spaced, parallel arms 28 joined at their free ends by a cross member 29. Slideably accommodated in the tube 27, and extending beyond both ends of the latter, is an actuating rod 30 that is coupled at its lower end to a retainer mechanism 31.

The retainer mechanism comprises a yoke 32 joined to the rod 30 and having parallel, spaced apart arms 33. Each arm is provided with a pair of vertical slots 34 in each of which is a slideable pin 35 and to which is pivoted one end of a link 36. The opposite end of each link 36 is pivoted by a pin 37 to one end of a finger 38. One end of each finger 38 is pivoted to the arms 28 by means of pins 39, the opposite end of each finger 38 being free.

The operating rod 30 is encircled by a spring 40 which reacts between the upper end of the tube 27 and a stop 41 carried by the rod 30. The rod, therefore, constantly is biased in a downward direction.

When the rod 30 is in the position shown in FIGS. 1 and 2, the fingers 38 are projected outwardly and bear against abutments 42 carried by the cross member 29 so as to limit outward movement of the fingers. The rod 30 may be raised from the position shown in FIGS. 1 and 2, however, whereupon the pins 35 will move toward the bottom of the slots 34. Following bottoming of the pins 35 at the lower ends of the slots 34, continued upward movement of the rod 30 will cause the links 36 to swing the fingers 38 to the retracted positions shown in FIG. 4. Retracting movement of the fingers 38 continues until their free ends engage the arms 33 of the yoke 32. The arms of the yoke have downwardly converging sides 43, thereby enabling the free ends of the fingers to occupy positions quite close to one another. The downwardly converging sides of the yoke arms 33 ensure that, upon downward movement of the rod 30, the fingers 38 will be thrust apart, whereby the avoidance of binding of the fingers is assured.

The body 1 and the anchor member 26 may be secured to one another in a selected position of adjustment, if desired, by means of a set screw 44 which extends into the opening 25 for engagement with the tube 27 or one of the arms 28.

Alternatively, the body 1 and the anchor device 26 may be maintained under a constant bias when the apparatus is in use. The biasing means 45 comprises a collar 46 which slideably accommodates the tube 27 and bears upon the upper surface of the body 1. Seated on the collar 46 is one end of a compression spring 47 which encircles the tube 27. The opposite end of the spring 47 bears against a collar 48 which also slideably accommodates the tube 27 and is provided with a pin 49 that is adapted to be accommodated in any one of a number of spaced openings 50 formed in the confronting wall of the tube 27. The operation of the biasing means 45 will be described hereinafter.

FIG. 1 illustrates a base member 51 and a fitting 52 that is intended to be welded to the base member. In the illustrated embodiment the base member 51 comprises a cylindrical pipe 53 having a wall 54 in which is formed an opening 55. The fitting 52 comprises an annular section 56 of such diameter as to be accommodated in the opening 55 and terminates at one end in a flange 57.

To condition the apparatus for positioning of the fitting 52 relative to the base member 51, the retaining fingers are moved to their retracted positions and thrust through the fitting so as to enable the flange 57 to engage the lower surface of the body 1. The clamps 16 then are adjusted to cause the arms 18 to engage the flange 57 and maintain it snugly in abutting relation with the body 1. The fixture then is moved to such position relative to the base member 51 that the annular section 56 of the fitting 52 is aligned with the opening 55. The supporting legs 3 then are adjusted so that the feet 12 seat upon the pipe wall 54 and support the body 1 at such level that the free end of the section 56 is at the desired position relative to the pipe wall 54.

The tube 27 of the anchor device 26 may be lowered into the pipe 53 via the opening 55, with the fingers 38 retracted, until the free ends of the fingers are at a level below that of the opening 55. The rod 30 then may be moved downwardly to effect swinging of the retainer arms 38 to their projected positions, following which the tube 27 again may be raised so as to enable the free ends of the retainer fingers to bear against the inside surface of the pipe wall 54. The set screw 44 (if used) then may be adjusted to grip the confronting surface of the tube 27 and maintain the parts in the positions shown in FIG. 1. The fitting then may be welded to the base members.

If the biasing means 45 is used in lieu of the set screw 44, the procedure referred to above may be followed, except for use of the set screw 44. Following engagement of the fingers 38 with the inner surface of the pipe wall 54, the collar 48 may be moved toward the collar 46 so as to compress the spring 47, following which the pin 49 may be thrust into an appropriate opening 50. Since the body 1 is unable to move toward the base member 51, because of the supporting legs 3, the spring 47 will act on the collar 48 tending to raise the tube 26 and the retainer fingers 38. As a consequence, the retainer fingers 38 will be forcibly, but yieldably, maintained in gripping relationship with the inner surface of the pipe wall 54, thereby securely supporting the fitting for welding.

As illustrated in FIG. 1, the axes of the pipe 53 and the fitting 52 are normal to one another. It is possible, however, to position the fitting 52 and the pipe 53 in a different manner. For example, if the axis of the fitting 52 should be inclined clockwise from the position shown in FIG. 1, the crank 11 of the left-hand supporting leg 3 may be rotated to extend the length of the leg, thereby tipping the fitting 52 clockwise. The fitting may be tipped counterclockwise by similar manipulation of the crank 11 of the right-hand supporting leg 3. The fitting 52 also may be tipped into and out of the plane of FIG. 1 by adjustment of the screws 13 associated with the feet 12. By appropriate adjustment of selected ones of the supporting legs 3 and the adjusting screws 13, the fitting 52 may be adjusted relatively to the pipe 53 substantially universally.

Although the fixture is disclosed in the drawings as being utilized in the welding of a flanged fitting to a cylindrical pipe, it should be understood that other kinds of fittings, nozzles, pipes, and the like, may be substituted for the fitting 52 and that different kinds of base members, such as vessels, plates, housings, and the like, may be substituted for the pipe 53.

Following the welding of the fitting to the base member, the set screw 44 or the collar 48 is released, thereby enabling the operating rod to be moved downwardly, whereupon the retainer fingers will be retracted to positions in which they are disabled from engaging the inner surface of the pipe 54. The clamps 16 then may be released from the fitting and the anchor member 26 withdrawn through the fitting.

This disclosure is representative of a preferred embodiment of the invention, but is intended to be illustrative rather than definitive thereof. The invention is defined in the claims.

I claim:

1. A fixture for use in joining a tubular fitting to a base member having an opening therein, said fixture comprising a body for supporting said fitting; support means carried by said body for engagement with said base member at its exterior and operable to space said body at a selected distance from said base member; anchor means carried by said body, one end of said anchor means being movable into and out of said base member via said opening; retainer means carried by said anchor means at said one end thereof for movements between retracted and extended positions in which said retainer means is respectively disabled from and enabled to engage said base member at its interior; and operating means for moving said retainer means between said positions.

2. A fixture according to claim 1 including spring means reacting between said body and said anchor means for yieldably biasing the latter to move in a direction to reduce the distance between said body and said base member.

3. A fixture according to claim 1 including means for adjusting said support means for varying the distance between said body and said base member.

4. A fixture according to claim 1 wherein said body includes clamp members between which said tubular fitting may be gripped.

5. A fixture according to claim 4 including means for adjusting the relative positions of said clamp members.

6. A fixture according to claim 1 wherein said retainer means comprises fingers pivoted to said anchor means for oscillating movements.

7. A fixture according to claim 6 including abutments located in the path of movement of said fingers toward said extended position for limiting such movement.

8. Positioning apparatus for use in joining a tubular fitting to a base member having an opening therein, said apparatus comprising a body; means carried by said body for securing said fitting thereto; support means carried by said body and engageable with one side of said base member for supporting said body a selected distance from said one side of said base member; an anchor member adjustably carried by said body for movements of one end of said anchor member into and out of said opening; retainer means carried by said anchor member at said one end thereof for movements between retracted and projected positions in which said retainer means is respectively disabled from and enabled to engage said base member at its opposite side; means for moving said retainer means between said positions; and means for maintaining said body and said anchor member in a selected position of adjustment.

9. Apparatus according to claim 8 wherein said maintaining means comprises an adjustable clamp reacting between said body and said anchor member.

10. Apparatus according to claim 8 wherein said maintaining means comprises spring means reacting between said body and said anchor member.

11. Apparatus according to claim 8 wherein said support means comprises a pair of legs extending from said body, and means for adjusting the length of each leg.

12. Apparatus according to claim 8 wherein said support means comprises a pair of legs extending from said body, each of said legs terminating in a foot adapted to bear against said base member.

13. Apparatus according to claim 12 including adjustable means carried by each said foot for engagement with said base member.

14. Apparatus according to claim 8 wherein said retainer means comprises rockable fingers.

* * * * *